United States Patent [19]
Takatori

[11] Patent Number: 5,277,376
[45] Date of Patent: Jan. 11, 1994

[54] PHOTOGRAPHIC FILM CASSETTE

[75] Inventor: Tetsuya Takatori, Kanagawa, Japan

[73] Assignee: Fuji Photo Film Co., Ltd., Kanagawa, Japan

[21] Appl. No.: 851,161

[22] Filed: Mar. 13, 1992

[30] Foreign Application Priority Data

Mar. 15, 1991 [JP] Japan .................. 3-77001

[51] Int. Cl.$^5$ .............................................. G03B 1/04
[52] U.S. Cl. ............................................... 242/71.1
[58] Field of Search ................. 242/71, 71.1, 71.7, 242/71.8, 71.9; 354/275

[56] References Cited

U.S. PATENT DOCUMENTS

| | | | |
|---|---|---|---|
| 4,407,579 | 10/1983 | Huff | 354/275 |
| 4,834,306 | 5/1989 | Robertson et al. | 242/71.9 |
| 4,883,235 | 11/1989 | Niedospial, Jr. | 242/71.1 |
| 4,883,236 | 11/1989 | Niedospial, Jr. et al. | 242/71.1 |
| 4,887,776 | 12/1989 | Niedospial, Jr. et al. | 242/71.1 |
| 5,031,852 | 7/1991 | Dowling et al. | 242/71.1 |
| 5,040,739 | 8/1991 | Wolf et al. | 242/71.1 |
| 5,046,681 | 9/1991 | Niedospial | 242/71.1 |
| 5,046,682 | 9/1991 | Niedospial | 242/71.1 |
| 5,102,062 | 4/1992 | Bush | 242/71.1 |

FOREIGN PATENT DOCUMENTS 2921379 11/1980 Fed. Rep. of Germany .

Primary Examiner—John M. Jillions
Assistant Examiner—Eileen A. Dunn
Attorney, Agent, or Firm—Sughrue, Mion, Zinn, Macpeak & Seas

[57] ABSTRACT

A photographic film cassette contains photographic film, of which a leader is separated from a roll of film while the spool rotates under a condition of clamping the roll between two spool flanges, and is thereby caused to advance outside a cassette shell. A circumferential lip projects from around a first flange toward the roll, and is in contact with one lateral edge of an outermost turn of the roll. A passage ridge is formed on the lower surface of a film passageway, supports one lateral edge of the film during passage through the passageway after being flexed transversely by the lip, and prevents the film edge from contact with the lower surface. The first passage ridge is formed to satisfy the following conditions, and prevents the film from being worn down by a rub while advanced outward:

$$0.4 \leq D_1 \leq 6, \text{ and}$$

$$0.5 \leq D_2 \leq E;$$

where $D_1$ mm is a distance between the passage ridge and a periphery of the lip; $D_2$ mm is a height at which the passage ridge projects from the lower surface; and E mm is a height at which the first flange extends upward from an extended plane of the lower surface.

22 Claims, 4 Drawing Sheets

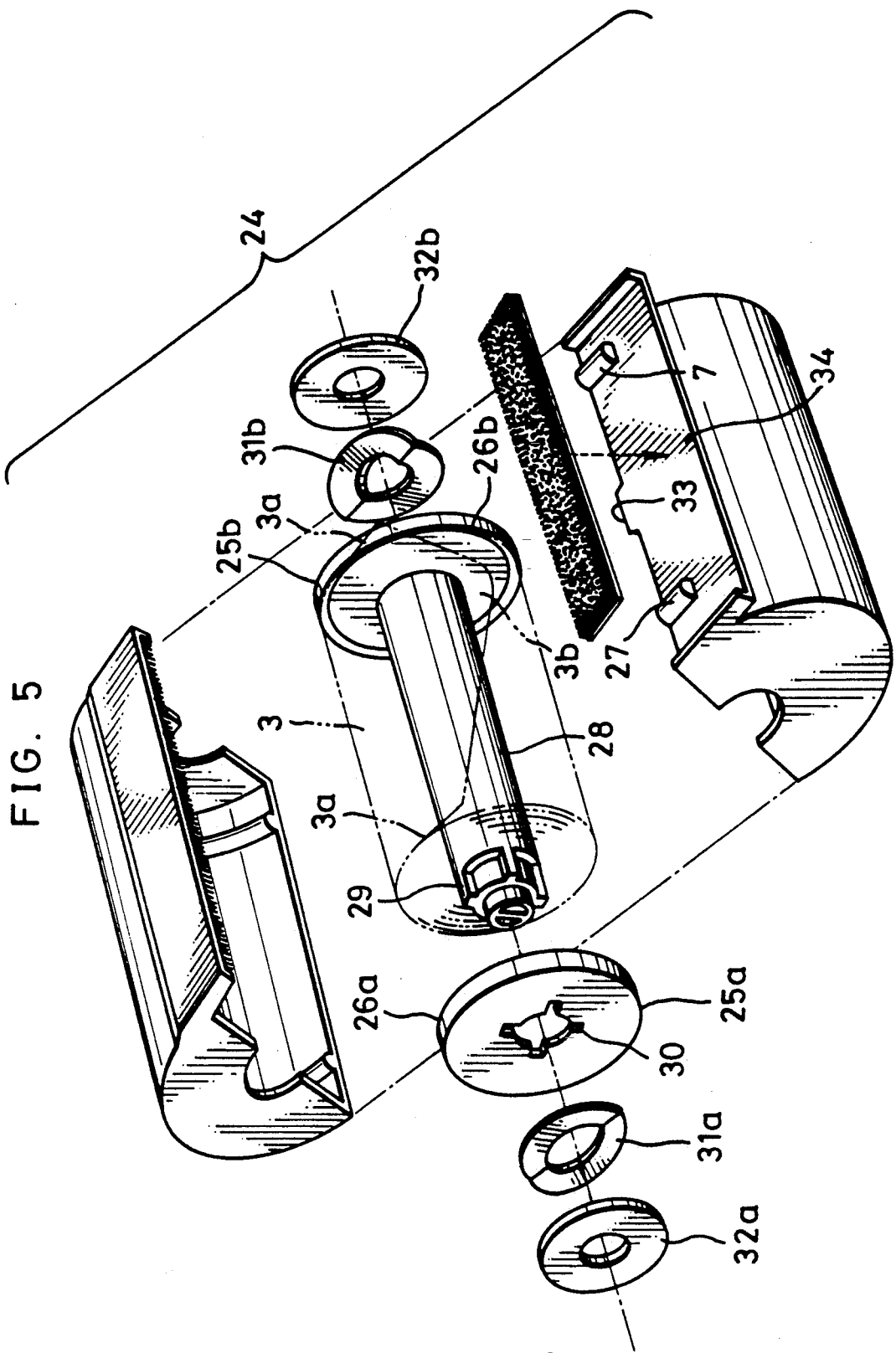

PHOTOGRAPHIC FILM CASSETTE

BACKGROUND OF THE INVENTION

1. Field of the Invention

The present invention relates to a photographic film cassette of which rotation of a spool causes photographic film to advance to the outside of a cassette shell. In particular, the invention is an improvement of the cassette shell which protects the film from damage.

2. DESCRIPTION OF THE RELATED ART

A known photographic film cassette includes a photographic filmstrip (hereinafter referred to as film) positioned so that the film leader does not protrude from the cassette shell prior to loading the cassette in a camera. Such a device is disclosed in U.S. Pat. No. 4,887,776. Simple film-advancing mechanisms of the camera are used with this type of cassette and include a construction which rotates a spool to unwind the film, thereby causing the leader to move through a film passageway and exit from the cassette.

In this construction, the roll of the film wound about the spool is prevented from loosening in order to transmit rotation of the spool to the leader. In such a cassette, the spool is constituted of a pair of spool pieces which are slidable relative to each other. A first spool piece is provided with a first flange, whereas the second spool piece is provided with a second flange. When one of the spool pieces is rotated, a cam mechanism associated with both spool pieces operates so as to shorten the interval between the flanges by sliding the spool pieces relative to one another. The first flange is provided with a circumferential lip which projects from around its peripheral edge for contact with a side of the outermost turn of the roll of film in order to prevent the roll from loosening. When sliding the spool pieces, the outermost turn of the roll is clamped between the second flange and the inside of the lip so that the roll is rotatable integrally with the spool and is thus prevented from loosening.

There is, however, a problem in this type of film cassette where the flanges are brought closer to one another to clamp the roll of film. A lateral edge of the film is contacted with, and rubbed against, the lip of the flanges with considerable force during the advancement of the film. Accordingly, the film edge may be worn by contact with the lip. This wearing gives rise to fine dust which may collect in the cassette. Also, the film edge is partially deformed or bowed in a successive manner by the interaction with the lip. The film edge, however, remains straight upstream from the lip. This causes an abrupt flexure of the film and, due to the rigidity of the film, a fracture may occur in the film edge due to the lateral deformation of the film in a sharp angular manner.

SUMMARY OF THE INVENTION

In view of the foregoing problems, an object of the present invention is to provide a photographic film cassette in which a lateral edge of photographic film is prevented from being damaged during advancement of the photographic film.

In order to achieve the above and other objects and advantages of this invention, a film passageway of the invention connects a film chamber and a film passage mouth. The passageway is defined between a first wall surface facing an emulsion surface of the photographic film which is positioned inward when wound within a roll of film, and a second wall surface facing a base surface of the film which is positioned outward when wound in the roll. A first circumferential lip is formed on a periphery of a first flange to project toward the roll for contact with a first edge of a pair of lateral edges of an outermost turn of the roll. A first passage ridge is associated with the first wall surface for supporting a lateral edge of the film during passage through the passageway after being flexed transversely by the first lip in order to prevent the lateral edge from contact with the first wall surface. The first passage ridge is formed to satisfy following conditions so as to prevent the film from being worn down while being advance outward:

$$0.4 \leq D_1 \leq 6, \text{ and}$$

$$0.5 \leq D_2 \leq E;$$

where $D_1$, as measured in mm, is a distance in a widthwise direction of the film between the first passage ridge and a circumferential edge of the first lip. $D_2$, as measured in mm, is a height at which the first passage ridge projects from the first wall surface and E as measured in mm is a height at which the first flange extends upward from an extended plane of the first wall surface.

In accordance with the present invention, a flexed portion of the lateral edge in contact with the lip then recovers a straight form, in a gradual manner, downstream from the lip. The flexure occurs over a distance, transverse to the film, that is larger than the conventional construction and thus, sharp bending of the film is eliminated. Also, the lateral edge of the film will not be worn down by contact with the lip and thus, fine dust does not accumulate. Finally, fracturing of the lateral edge of the film is eliminated through the present invention.

BRIEF DESCRIPTION OF THE DRAWINGS

The above objects and advantages of the present invention will become more apparent from the following detailed description when read in connection with the accompanying drawings, in which:

FIG. 5 is an exploded perspective view illustrating a film cassette in accordance with a second preferred embodiment.

DETAILED DESCRIPTION OF THE PREFERRED EMBODIMENT

Figure 1:
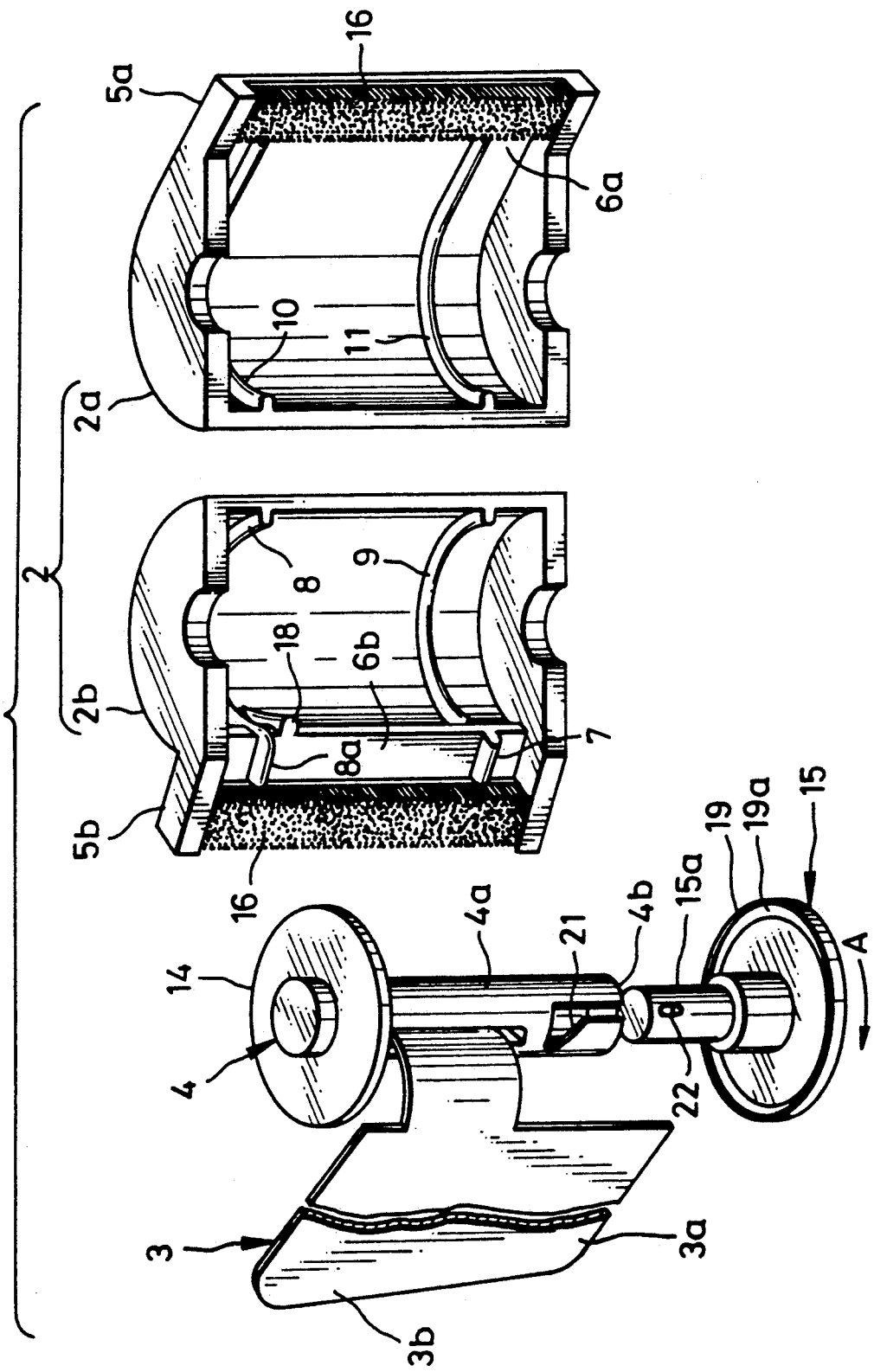
FIG. 1 is an exploded perspective view illustrating a film cassette in accordance with a first preferred embodiment of the present invention.

FIG. 1 illustrates the first preferred embodiment of the present invention. A cassette shell 2 of a photographic film cassette 1 is constituted of a pair of shell halves 2a and 2b molded from resin. Photographic film 3 is contained in the cassette shell 2, in a wound state, on a core 4a. A trailing end of the film 3 is fixed on a core 4a of the spool 4 by means of claws formed in a slit formed in the core 4a. Port portions 5a and 5b are respectively formed on the upper and lower shell halves 2a and 2b so as to define a film passageway 6, through which the film 3 is passed.

A lower wall surface 6b of the passageway 6 is provided with a pair of passage ridges 7 and 8a which are positioned so as to correspond to portions of the film outside of the image recording areas in the film 3. The passage ridge 7 is in contact with the film 3 passing through the passageway 6 on the side of its emulsion surface, and supports one lateral edge 3a of the film 3 when pressed laterally against the film 3, as illustrate in FIG. 3, so as to prevent it from being bent, scratched, ground, worn or otherwise damaged. The passage ridge 8a holds the film 3, during passage through the passageway 6, to be flush with the top of the passage ridge 7. A light-trapping fabric, or plush 16, is attached to upper and lower wall surfaces 6a and 6b of the passageway 6. A separating claw 18 is formed in an innermost position of the lower wall surface 6b for separating a leading end 3b of the film 3 from the roll when it is rotated, within the film chamber past the port potion 5b, so as to direct it to the passageway 6.

The spool 4 consists of two molded spool pieces, of which one consists of the core 4a and a flange 14 formed integrally and another consists of a core 15a and flange 15 formed integrally. Whereas the flange 14 is flat, the other flange 15 is provided with a circumferential lip or projection 19 projecting from around the flange 15 and having an inclined or bevelled internal surface 19a. The core 15a is loosely fitted in a hollowness formed in a distal end 4b of the core 4a. A cam groove 21 having an inclined edge is formed in the core 4a. The cam groove 21 is engaged with a pin 22 disposed on the core 15a. When the spool piece having the flange 15 is rotated in the direction of the arrow A, the flange 15 is shifted toward the flange 14 so as to clamp the roll of the film 3 from lateral sides thereof.

Figure 2:
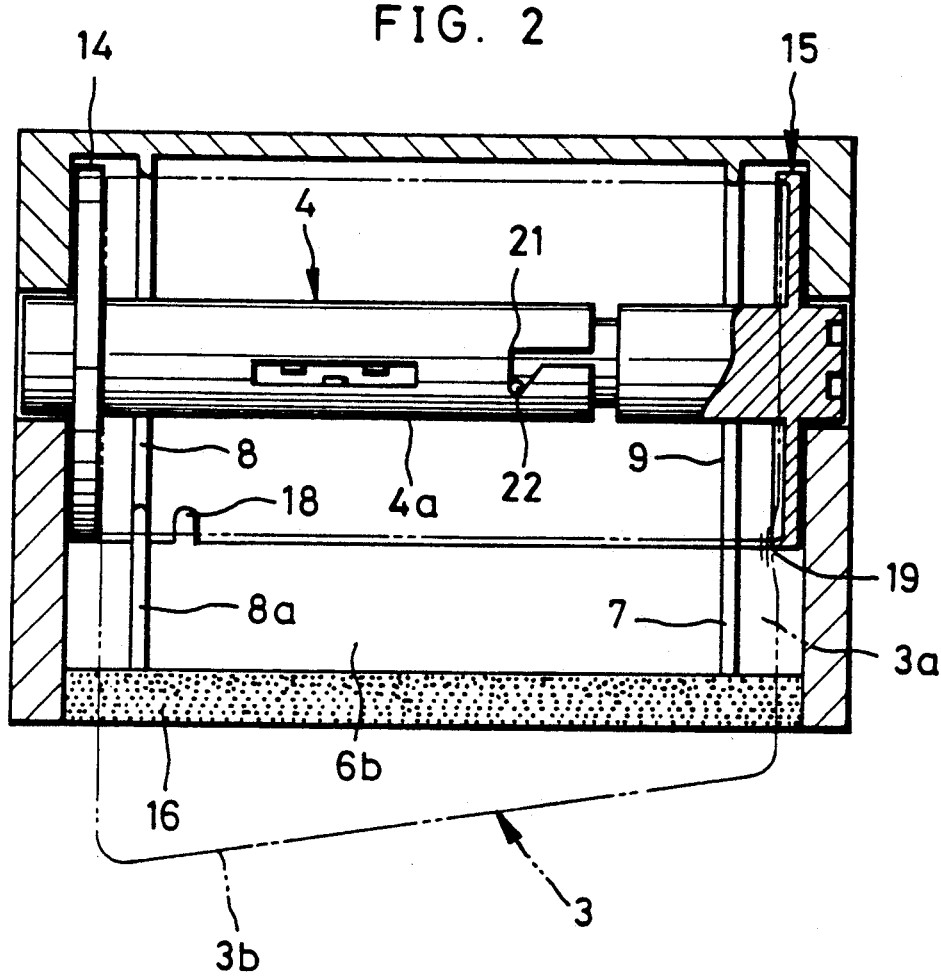
FIG. 2 is a vertical section illustrating the cassette illustrated in FIG. 1.

The passage ridge 8a is formed to extend from an arcuate ridge 8 formed on the cylindrical inside of the lower shell half 2b. An arcuate ridge 9, similar to the ridge 8, is formed on the lower shell half 2b in correspondence with the passage ridge 7. The cylindrical inside of the upper shell half 2a is provided with arcuate ridges 10 and 11. The arcuate ridges 8 to 11, as illustrated in FIG. 2, define a pair of annular ridges, and prevent the roll from being loose enough to expand in excess so that the flanges 14 and 15 can clamp the roll consistently.

The operation of the cassette will now be described. When loaded in a camera, a film-advancing mechanism of the camera rotates the core 15a in the direction of the arrow A, or counterclockwise, in FIG. 3. The pin 22 is moved inward within the cam groove 21 by contact with the inclined edge thereof, so that the flange 15 moves closer to the flange 14 to clamp the roll of the film 3 therebetween. Rotation of the flanges 14 and 15 is transmitted to the roll and causes the roll to rotate. The outermost turn of the roll of the film 3 is prevented from loosening because it is held by the bevelled surface 19a.

Figure 3:
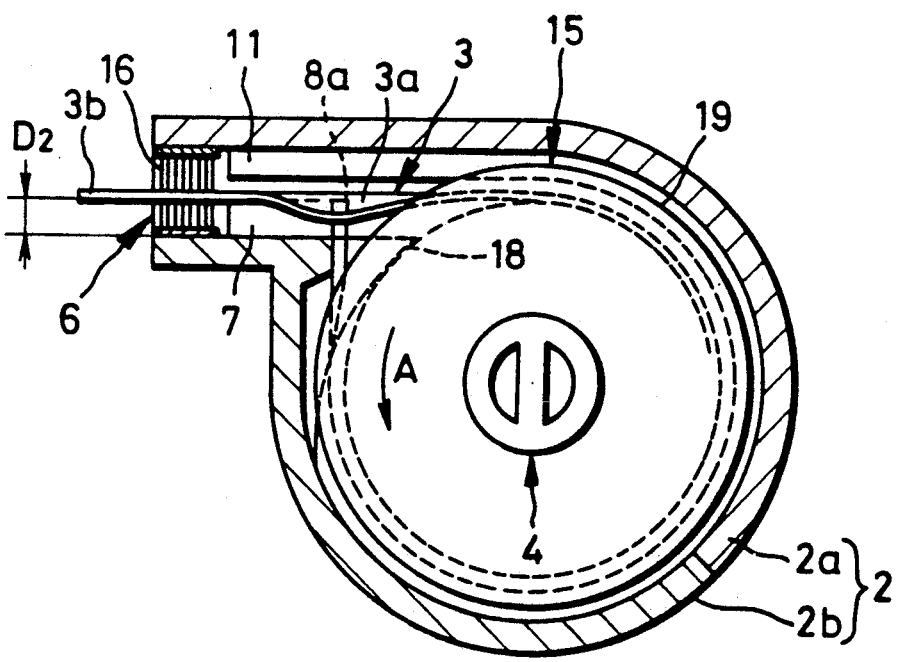
FIG. 3 is a cross section illustrating the cassette illustrated in FIG. 1.

When the leading end 3b reaches the separating claw 18 during rotation of the core 15a, the leading end 3b is picked up by the separating claw 18. With the leading end 3b separated from the inner roll of the film 3, the core 15a is still rotated. The film 3 rotates together with the cores 4a and 15a and the flanges 14 and 15 so as to advance the leading end 3b into the passageway 6. During passage of the film 3, the film edge 3a is pressed and deformed by the lip 19 in the downward direction, or from the back surface to the emulsion surface, as illustrated in FIG. 3, in correspondence with the rotation of the flange 15. The passage ridge 7, however, supports film edge 3a from beneath the film 3, so as to avoid contact between the edge 3a and the lower surface 6b.

In a conventional film cassette, the circumferential lip would press the film edge and deform or bow it in a sharp, angular manner during an advancement of the film toward the outside of the cassette shell. In the present invention, however, the deformed portion of the film edge 3a in contact with the lip 19 recovers a straight form, gradually downstream from the lip 19. This deformation or flexure occurs over a dimension larger than the conventional construction and is thus less sharp. Also, the resistance against the advance of the film 3 is reduced, so that it can be advanced by a small torque through the passageway 6.

Figure 4:
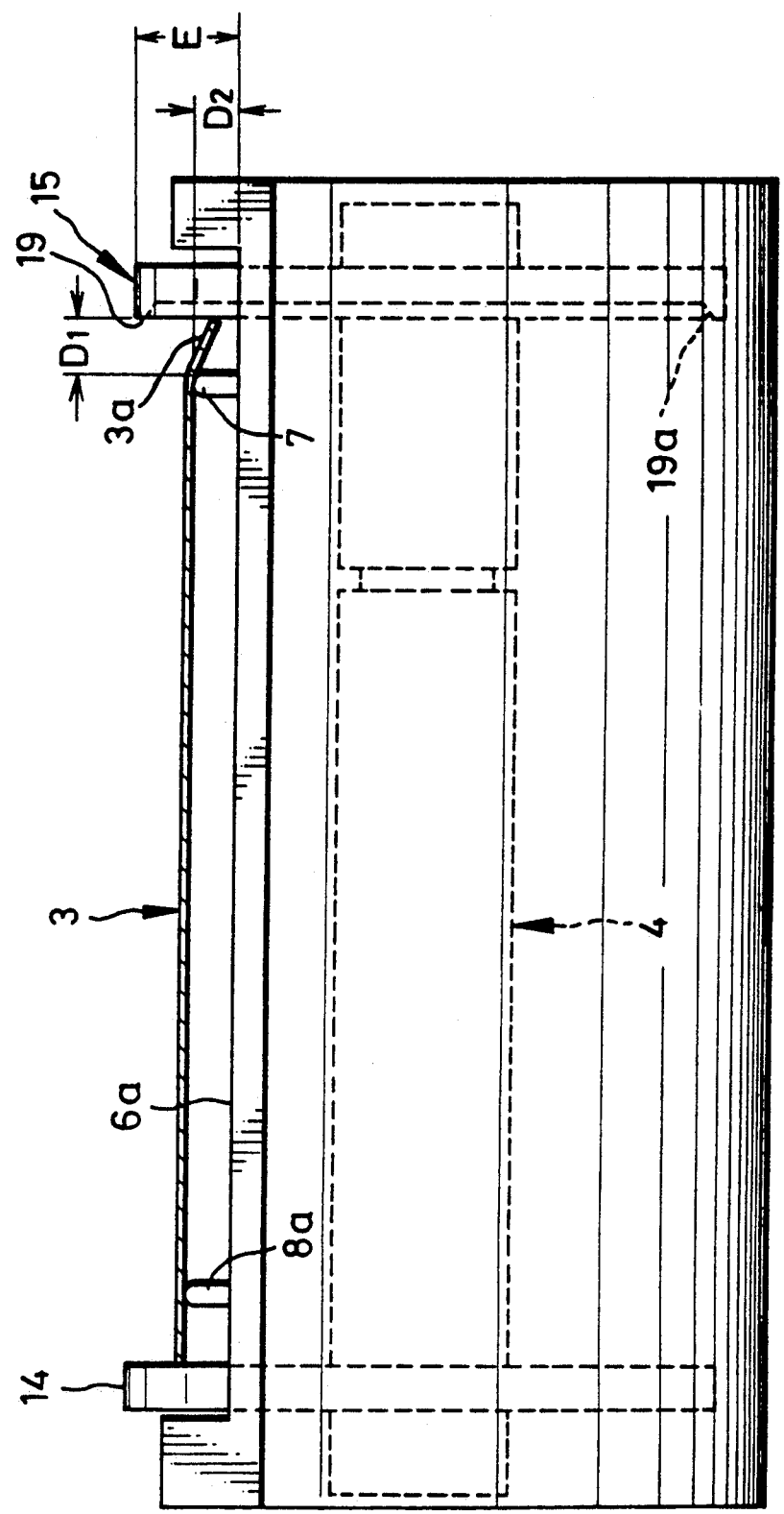
FIG. 4 is a side elevation illustrating a lower shell half with photographic film, showing particularly the relationship between a film passageway and flanges.

Let $D_1$ be a distance between the center of the passage ridge 7 and the edge of the lip 19 vertically to the advancing direction of the film 3 as illustrated in FIG. 4. Should $D_1$ be too small, the deformation of the film edge 3a would be conducted in so small a dimension that the film 3 would be damaged easily. Should $D_1$ be too large, the image recording area of the film 3 may be scratched by ridge 7, or the film edge 3a would be in contact with the lower surface 6b. Let $D_2$ be a height of the passage ridge 7. Should $D_2$ be too small, the film edge 3a would be in contact with the lower surface 6b. Should $D_2$ be too large, the passageway 6 would have to define an excessively large spacing therethrough, or the edge of the passage ridge 7 close to the flange 15 might scratch the film 3. Experiments were conducted as to various values taken by $D_1$ and $D_2$ on the condition of advancing he film leader are shown in Table 1.

TABLE 1

| | $D_1$ | | | | | | | | | | |
|---|---|---|---|---|---|---|---|---|---|---|---|
| | 0.1 | 0.2 | 0.3 | 0.4 | 0.5 | 1 | 2 | 4 | 5 | 6 | 7 | 8 |
| 0.1 | 4 | 4 | 4 | 4 | 4 | 4 | 4 | 4 | 4 | 4 | 4 | 4 |
| 0.3 | 4 | 4 | 3 | 2 | 1 | 1 | 1 | 1 | 1 | 1 | 1 | 1 |
| 0.5 | 2 | 2 | 2 | 1 | 1 | 1 | 1 | 1 | 1 | 1 | 2 | 2 |
| 0.7 | 2 | 2 | 1 | 1 | 1 | 1 | 1 | 1 | 1 | 1 | 2 | 2 |
| 0.9 | 2 | 1 | 1 | 1 | 1 | 1 | 1 | 1 | 1 | 1 | 2 | 2 |
| 1.1 | 2 | 1 | 1 | 1 | 1 | 1 | 1 | 1 | 1 | 1 | 2 | 2 |
| 1.3 (=E) | 2 | 2 | 2 | 2 | 2 | 2 | 2 | 2 | 2 | 2 | 2 | 3 |
| 1.5 | 3 | 3 | 3 | 3 | 3 | 3 | 3 | 3 | 3 | 3 | 3 | 3 |
| 1.7 | 3 | 3 | 3 | 3 | 3 | 3 | 3 | 3 | 3 | 3 | 3 | 3 |

The lengths $D_1$ and $D_2$ were measured in mm. E is the height of the top of the flange 15 measured as vertical length from the lower surface 6b up to the uppermost position of the periphery of the flange 15. The width of the passage ridge 7 is 0.3 mm. The value 1 in Table 1 represents a state where little dust exists so that there is no influence on the image quality, or where no dust is recognized. The value 2 represents a state where a small amount of dust is created, some of which adhered to the film within frames. The value 3 represents a state where a considerable amount of dust is created, some of which adhered to the film within frames. The value 4 represents a state where a considerable amount of dust is created, some of which adhered within frames, and where damage occurs along the film edge.

As is understood form Table 1, the film leader can be consistently advanced without damage by determining $D_1$ and $D_2$ to satisfy:

$0.4 \leq D_1 \leq 6$; and $0.5 \leq D_2 \leq E$.

FIG. 5 illustrates a second preferred embodiment of the present invention. A cassette 24 has two flanges or disks 25a and 25b, both of which have a circumferential lip designated with reference numerals 26a and 26b. A film passageway 34 is provided with the passage ridge 7 and a passage ridge 27 similar thereto. Each of the two distal ends of a spool 28 is provided with engaging projections 29 disposed in a form of a cross. The flanges 25a and 25b have engaging recesses 30 which correspond to the engaging projections 27. Though the projections 29 and the recesses 30 are formed not only on the left side but on the right side of the spool 28, they are illustrated only on the left side in FIG. 5. There is a considerable degree of looseness between the projections 29 and the recesses 30, so that the flanges 25a and 25b are movable relative to the spool 28 not only in the axial direction but slantwise. The flanges 25a and 25b are biased inward by spring washers 31a and 31b which are of a V-shape. A pair of rings 32a and 32b are fixed on the spool 28 at positions outward from the spring washers 31a and 31b in a tightly fitting manner. The rings 32a and 32b support the washers 31a and 31b from behind, as well as prevent friction between the washers 31a and 32a and the inner walls of the film chamber. A separating claw 33 is disposed inside of cassette 24.

In the cassette 24, rotation of the spool 28 is transmitted to the flanges 25a and 25b via the projections 29 and the recesses 30. Because the flanges 25a and 25b are pressed inward by the bias of the spring washers 31a and 31b, the central flat surface of the inward side of the flanges 25a and 25b is pressed against both lateral sides of the roll of the film 3, so that the roll becomes rotatable according to rotation of the flanges 25a and 25b. The outermost turn of the film 3 is kept from loosening by the lips 26a and 26b.

When the rotation of the spool 28 brings the separating claw 33 to separate the leading end 3b, the leading end 3b is directed to the passageway 34. Both film edges 3a press the lips 26a and 26b outward, so that the flanges 25a and 25b are slid outward against the spring washers 31a and 31b and spread slantwise relative to the spool 28.

The film edges 3a are deformed downward from the base surface in accordance with the rotation of the lips 26a and 26b. The passage ridges 7 and 27, however, keep the deformation from being sharp, and prevent the film edges 3a from contacting with the lower wall surface of the passageway 34. The film edges 3a are thus not scratched or otherwise damaged. The torque necessary for advancing the film is reduced as well.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, as defined by the appended claims, they should be construed as included therein.

What is claimed is:

1. A photographic film cassette having a spool for winding photographic film in a roll, and a cassette shell for containing said spool rotatably in a film chamber thereof, a leader of said film being separated by a separating claw from said roll of film while said spool rotates in an unwinding direction under a condition where both sides of said roll are clamped between first and second flanges of said spool, said leader is thereby caused to advance to an outside of said cassette shell through a film passage mouth, said cassette comprising:

a film passageway between said film chamber and said film passage mouth, said film passageway being defined between a first wall surface facing an emulsion surface of said film, said emulsion surface being positioned inward when wound said roll, and a second wall surface facing a base surface of said film, said base surface being positioned outward when wound in said roll;

a first circumferential lip formed on a periphery of said first flange and projecting toward said second flange so as to contact with a first edge of a pair of lateral edges of an outermost turn of said roll;

a first passage ridge formed on said first wall surface and extending across less than half of said film passageway so as to support a lateral edge of said film, when said film is being passed through said passageway after being flexed transversely by said first lip, in order to prevent said lateral edge from contact with said first wall surface, said first passage ridge formed to satisfy the following conditions so as to prevent said film from being worn while advanced outward:

$$0.4 \leq D_1 \leq 6, \text{ and}$$

$$0.5 \leq D_2 < E;$$

where $D_1$ as measured in mm, is a distance in a widthwise direction of said film between said first passage ridge and a circumferential edge of said first lip;

$D_2$, as measured in mm, is a height at which said first passage ridge projects from said first wall surface; and E, as measured in mm, is a height at which said first flange extends upward from an extended plane of said first wall surface.

2. A photographic film cassette as claimed in claim 1, wherein said cassette shell includes a pair of resinous shell halves.

3. A photographic film cassette as claimed in claim 2, wherein said first lip is provided with an inclined surface formed on a portion thereof facing said roll.

4. A photographic film cassette as claimed in claim 3, wherein said cassette shell further includes a pair of annular ridges formed in said film chamber so as to be in contract with a cylindrical surface of said roll.

5. A photographic film cassette as claimed in claim 4, further comprising:

a second passage ridge formed on said first wall surface so as to support a second lateral edge of said film during passage through said passageway in order to prevent said film emulsion surface from coming into contact with said first wall surface.

6. A photographic film cassette as claimed in claim 5, wherein said spool comprises:

first and second spool pieces supported by said cassette shell respectively in cantilever fashion;

said first spool piece includes a first core, said first flange, said first lip and a cam follower; and said second spool piece includes a second core, said second flange and a cam groove, said second core being coupled with said first core in a rotatable and slidable manner, said cam follower being receive in said cam groove so as to cause said spool to change from a lengthened state, where an interval between said flanges in relatively large, to a shortened state, where said interval is relatively small with respect to said lengthened state, when said first and second spool pieces are rotated relative to each other.

7. A photographic film cassette as claimed in claim 6, wherein said cam follower and said cam groove are configured so that during an initial stage of rotation of said first spool piece in said unwinding direction, said second spool piece is slid relative to said first spool piece so that said spool is changed from said lengthened state to said shortened state, and then said first and second spool pieces rotate integrally while maintaining said shortened state.

8. A photographic film cassette as claimed in claim 7, wherein:
said first core has a first end supported by said cassette shell and a second end having said cam follower formed thereon; and
said second core has a third end supported by said cassette shell and a fourth end fitted on said second end, said cam groove being formed in said fourth end.

9. A photographic film cassette as claimed in claim 8, wherein said second end is a rod, and said fourth end is a hollow cylinder adapted to accept said second end therein.

10. A photographic film cassette as claimed in claim 9, wherein a trailer of said film is anchored on said second core.

11. A photographic film cassette as claimed in claim 10, wherein said second core further comprises:
a slit formed between said second flange and said fourth end for inserting said trailer; and
a anchoring device associated with said slit for anchoring said trailer on an inside of said slit.

12. A photographic film cassette as claimed in claim 11, wherein said separating claw is disposed opposite said film passage at a position proximate said second flange with reference to lengthwise direction of said cassette shell.

13. A photographic film cassette as claimed in claim 12, wherein a leading end of said leader is cut slantwise so as to project a side thereof corresponding to said separating claw.

14. A photographic film cassette as claimed in claim 4, wherein said first and second flanges are slidably fitted on a core of said spool and said cassette further comprises a pair of biasing members disposed on said core so as to press said respective first and second flanges so as to clamp said roll therebetween.

15. A photographic film cassette as claimed in claim 14, further comprising:
a second circumferential lip formed on a periphery of said second flange and projecting toward said roll so as to contact with a second lateral edge of said outermost turn of said roll; and
a second passage ridge formed on said first wall surface and extending in a direction which is parallel to a direction of advancement of said film for supporting a second lateral edge of said film during passage through said passageway after being flexed transversely by said second lip in order to prevent said second lateral edge from contacting said first wall surface.

16. A photographic film cassette as claimed in claim 15, wherein said second passage ridge is formed to satisfy the following conditions so as to prevent said film from being worn while being advanced outward:

$$0.4 \leq D_3 \leq 6, \text{ and}$$

$$0.5 \leq D_4 \leq F;$$

where $D_3$, as measured in mm, is a distance in a widthwise direction of said film between said second passage ridge and a circumferential edge of said second lip;
$D_4$, as measured in mm, is a height at which said second passage ridge projects from said first wall surface; and
$F$, as measured in mm, is a height at which said second flange extends upward from an extended plane of said first wall surface.

17. A photographic film cassette as claimed in claim 16, wherein said second lip has an inclined surface formed on a portion thereof facing said roll.

18. A photographic film cassette as claimed in claim 17, wherein said first and second flanges are loosely fitted on said core so that said flanges are spread slantwise toward said passageway when pressed by said film, while said film advances between said first and second lips.

19. A photographic film cassette as claimed in claim 18, wherein each of said first and second flanges has a bearing hole formed therein and N recesses formed therein so as to extend from said bearing hole; and
N projections are formed on each end of said core so as to fit into a corresponding of said N recesses when said first and second flanges are fitted on said core, said projections transmitting rotation of said core to said flanges, N is an integer.

20. A photographic film cassette as claimed in claim 19, wherein N is four.

21. A photographic film cassette as claimed in claim 20, wherein said biasing members are spring washers.

22. A photographic film cassette as claimed in claim 21, wherein rings are fitted outward from said respective spring washers on said core so as to support said spring washers and so as to facilitate sliding contact between said spring washers and inner walls of film chamber.

* * * * *